H. A. R. PETERMAN.
GAGE ATTACHMENT.
APPLICATION FILED JUNE 7, 1918.
1,284,762.
Patented Nov. 12, 1918.
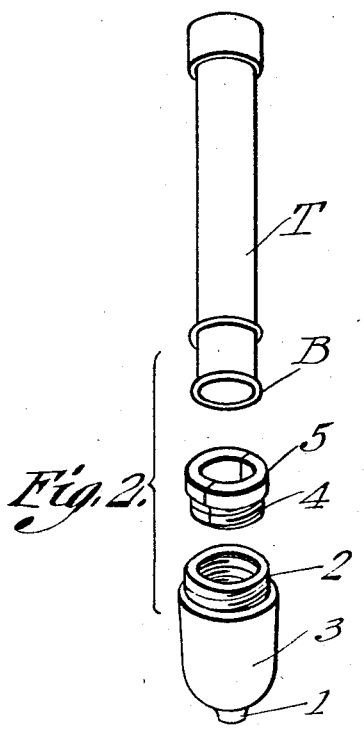
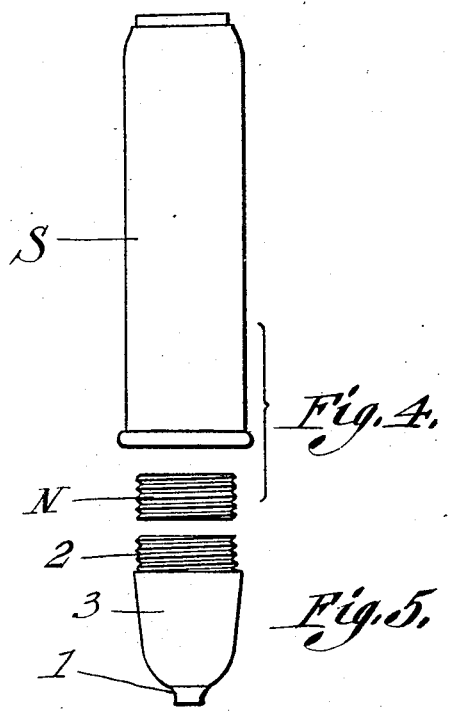
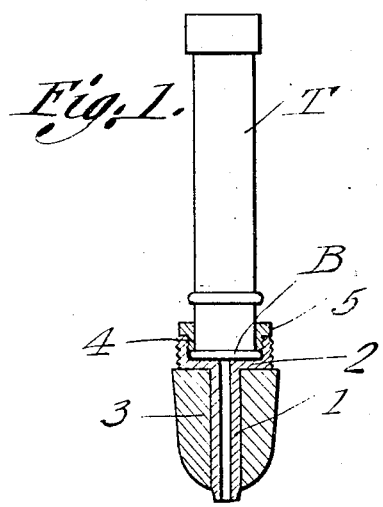
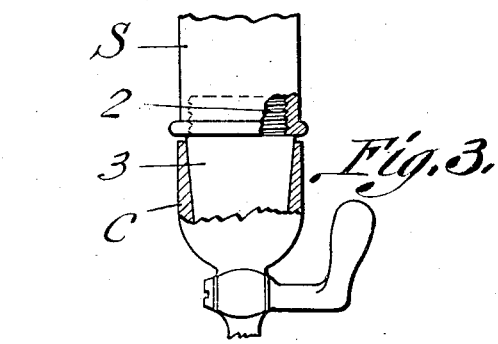
H. A. R. Peterman
Inventor

UNITED STATES PATENT OFFICE.

HARRY A. R. PETERMAN, OF CHICAGO, ILLINOIS.

GAGE ATTACHMENT.

1,284,762.  Specification of Letters Patent.  Patented Nov. 12, 1918.

Application filed June 7, 1918.  Serial No. 238,711.

*To all whom it may concern:*

Be it known that I, HARRY A. R. PETERMAN, a citizen of the United States, residing at Chicago, in the county of Cook and State of Illinois, have invented a new and useful Gage Attachment, of which the following is a specification.

This invention relates to an attachment for compression gages such as used to ascertain the air pressures in tires, one of the objects of the invention being to provide an attachment which can be applied readily to the well known types of tire or compression gages in general use and, when so applied, will permit the gages to be used for locating engine trouble.

Another object is to provide an attachment of this character which is simple and inexpensive in construction and which allows the gage to be applied to the priming cup of the engine to indicate pressures in the cylinders.

With the foregoing and other objects in view the invention consists of certain novel details of construction and combinations of parts which will be hereinafter more fully described and pointed out in the claims, it being understood that various changes may be made in the construction and arrangement of the parts without departing from the spirit or sacrificing any of the advantages of the invention as set forth in the appended claims.

In the accompanying drawings the preferred form of the invention has been shown.

In said drawings,

Figure 1 is a section through the attachment, the same being shown applied to a "Twitchell" tire gage which is shown in elevation.

Fig. 2 is a perspective view of the several parts shown in Fig. 1, the same being shown detached.

Fig. 3 is a section through a portion of a priming cup and showing applied thereto, the present improvements attached to a "Schrader" gage, only a portion of the gage being shown.

Fig. 4 is an elevation of a "Schrader" gage, showing the nut removed from the bottom thereof.

Fig. 5 is an elevation of the attachment arranged to be substituted for the nut removed from the gage in Fig. 4.

Referring to the figures by characters of reference, T designates one form of tire gage known as the "Twitchell", the same being provided at one end with an annular bead B. Another form of gage, known generally as the "Schrader", has been indicated at S and is provided in its bottom with a removable nut N.

The attachment constituting the present invention includes a tubular stem 1 projecting from the center of a cup 2 the external diameter of which is equal to the diameter of the nut N while its internal diameter is sufficient to permit the bead B to be inserted thereinto. Both the inner and outer faces of the wall of the cup 2 are screw threaded. A tapered sleeve of rubber or the like, shown at 3, is fitted tightly on the stem 1 and against the cup 2. The internal threads of the cup are adapted to be engaged by threads on a split retaining ring 4 having an annular flange adapted to engage the edge of the cup, said flange being shown at 5.

When the attachment is to be applied to the tire gage shown in Fig. 2, for the purpose of testing the pressures in the cylinders of an engine, the split ring 4 is unscrewed and the end of the gage is inserted into the cup 2. The sections of the ring are then placed around the gage T above the bead B and screwed into the cup, thus to retain the gage and attachment in assembled relation. The attachment is then forced into a priming cup C and the pressure can be taken, as will be obvious. When the attachment is to be used with the gage shown in Fig. 4, the nut N is unscrewed therefrom and the cup 2, with the split ring removed therefrom, is screwed into the gage S, as shown in Fig. 3. The gage can then be used in the same manner heretofore described for getting pressures in the engine and locating trouble.

By providing an attachment such as herein described it becomes unnecessary to provide expensive gages such as heretofore used to determine pressures in an engine and a single tire gage of ordinary construction can be used in lieu thereof.

What is claimed is:—

1. An attachment for tire gages, including an externally screw threaded cup, a stem extending therefrom and having a passage therethrough, a soft rubber sleeve upon the stem, and a split ring screwed into and detachable from the cup.

2. An attachment for tire gages, including a cup having interior and exterior screw threads, a tubular stem extending from the cup, a tapered rubber sleeve upon the stem and abutting against the cup, and a split ring removably engaging the interior threads of the cup.

In testimony that I claim the foregoing as my own, I have hereto affixed my signature in the presence of two witnesses.

HARRY A. R. PETERMAN.

Witnesses:
HAROLD McGRATH,
NELS BERLIN.

Copies of this patent may be obtained for five cents each, by addressing the "Commissioner of Patents, Washington, D. C."